United States Patent
Steelberg et al.

(10) Patent No.: US 9,633,505 B2
(45) Date of Patent: Apr. 25, 2017

(54) SYSTEM AND METHOD FOR ON-DEMAND DELIVERY OF AUDIO CONTENT FOR USE WITH ENTERTAINMENT CREATIVES

(75) Inventors: Ryan Steelberg, Irvine, CA (US); Chad Steelberg, Newport Beach, CA (US)

(73) Assignee: Veritone, Inc., Newport Beach, CA (US)

( * ) Notice: Subject to any disclaimer, the term of this patent is extended or adjusted under 35 U.S.C. 154(b) by 0 days.

(21) Appl. No.: 12/466,091

(22) Filed: May 14, 2009

(65) Prior Publication Data
US 2010/0223351 A1    Sep. 2, 2010

Related U.S. Application Data

(63) Continuation-in-part of application No. 12/221,058, filed on Jul. 30, 2008, now abandoned, which is a
(Continued)

(51) Int. Cl.
*G06F 7/00*     (2006.01)
*G06F 17/30*    (2006.01)
(Continued)

(52) U.S. Cl.
CPC ............ *G07F 17/16* (2013.01); *G06Q 30/02* (2013.01)

(58) Field of Classification Search
CPC ......... G06F 17/30011; G06F 17/30017; G06F 17/3089; G06F 15/16; G06F 30/02;
(Continued)

(56) References Cited

U.S. PATENT DOCUMENTS 5,287,407 A * 2/1994 Holmes ........................ 705/58
5,408,474 A * 4/1995 Wakamori et al. .......... 370/493
(Continued)

FOREIGN PATENT DOCUMENTS

WO    WO2007029881    3/2007

OTHER PUBLICATIONS

Garthwaite, et al., "The Role of Celebrity Endorsements in Politics: Oprah, Obama. and the 2008 Democratic Primary," Department of Economics, University of Maryland. Sep. 2008. Entire Document; http://econweb.umd.edu/~garthwaite/celebrityendorsements_garthwaitemoore.pdf.
(Continued)

*Primary Examiner* — Daniel Kuddus
(74) *Attorney, Agent, or Firm* — Joseph K. Liu; One LLP

(57) ABSTRACT

A method of creating and delivering an on-demand audio asset for inclusion in a creative is described. The method includes the steps of accessing a central processing environment, requesting at least one recording of at least a portion of an audio transmission generated from a communication device, generating at least one audio asset, adding the audio asset to a pool of related assets stored in a vault connected to the central processing environment, selecting the generated audio asset and at least one other related asset from the pool of related assets to form a creative, then requesting delivery of the creative to another communication device, and finally delivering the creative to the other communication device. The method is performed in part by a creative composition engine, which is also described. The engine includes a central processing environment having a processor, a digital recorder and a digital asset storage vault.

17 Claims, 3 Drawing Sheets

Related U.S. Application Data continuation-in-part of application No. 12/220,916, filed on Jul. 29, 2008, now abandoned, which is a continuation-in-part of application No. 12/144,194, filed on Jun. 23, 2008, said application No. 12/144,194 is a continuation-in-part of application No. 11/981,646, filed on Oct. 31, 2007, which is a continuation-in-part of application No. 11/981,837, filed on Oct. 31, 2007, now Pat. No. 7,809,603, said application No. 12/144,194 is a continuation-in-part of application No. 12/072,692, filed on Feb. 27, 2008, now abandoned, and a continuation-in-part of application No. 12/079,769, filed on Mar. 27, 2008, said application No. 12/079,769 is a continuation-in-part of application No. 12/042,913, filed on Mar. 5, 2008, now abandoned, and a continuation-in-part of application No. 12/072,692, which is a continuation of application No. 11/981,646.

(60) Provisional application No. 61/065,297, filed on Feb. 7, 2008, provisional application No. 61/131,386, filed on Jun. 6, 2008, provisional application No. 60/993,096, filed on Sep. 7, 2007.

(51) Int. Cl.
*G07F 17/16* (2006.01)
*G06Q 30/02* (2012.01)

(58) Field of Classification Search
CPC .................. G06F 17/16; G06F 17/3074; G06F 17/30743; G06F 17/30755
See application file for complete search history.

(56) References Cited

U.S. PATENT DOCUMENTS

| | | | |
|---|---|---|---|
| 5,758,068 A * | 5/1998 | Brandt et al. | 726/27 |
| 5,845,251 A * | 12/1998 | Case | 704/500 |
| 5,913,088 A * | 6/1999 | Moghadam et al. | 396/311 |
| 5,920,700 A * | 7/1999 | Gordon et al. | 709/226 |
| 6,055,581 A * | 4/2000 | Berglund et al. | 710/11 |
| 6,078,783 A * | 6/2000 | Kawamura et al. | 725/120 |
| 6,141,657 A | 10/2000 | Rothberg et al. | |
| 6,169,976 B1 * | 1/2001 | Colosso | 705/59 |
| 6,226,678 B1 * | 5/2001 | Mattaway et al. | 709/230 |
| 6,252,544 B1 * | 6/2001 | Hoffberg | 342/357.31 |
| 6,253,188 B1 | 6/2001 | Witek et al. | |
| 6,338,067 B1 | 1/2002 | Baker et al. | |
| 6,378,130 B1 * | 4/2002 | Adams | 725/95 |
| 6,429,812 B1 * | 8/2002 | Hoffberg | 342/357.31 |
| 6,496,803 B1 | 12/2002 | Seet et al. | |
| 6,629,081 B1 | 9/2003 | Cornelius et al. | |
| 6,698,020 B1 | 2/2004 | Zigmond | |
| 6,839,681 B1 | 1/2005 | Hotz | |
| 6,907,581 B2 | 6/2005 | Noy | |
| 6,954,728 B1 | 10/2005 | Kusumoto et al. | |
| 7,003,420 B2 | 2/2006 | Ur et al. | |
| 7,058,624 B2 | 6/2006 | Masters | |
| 7,200,565 B2 | 4/2007 | Basson et al. | |
| 7,584,118 B1 | 9/2009 | Bellare et al. | |
| 7,676,405 B2 * | 3/2010 | Steelberg | G06Q 10/087 705/28 |
| 2001/0037205 A1 | 11/2001 | Joao | |
| 2002/0002488 A1 | 1/2002 | Muyres et al. | |
| 2002/0013739 A1 * | 1/2002 | O'Donnell | G06Q 10/08 705/26.81 |
| 2002/0042738 A1 | 4/2002 | Srinivasan et al. | |
| 2002/0056120 A1 | 5/2002 | McTernan et al. | |
| 2002/0073084 A1 | 6/2002 | Kauffman et al. | |
| 2002/0103698 A1 | 8/2002 | Cantrell | |
| 2002/0123994 A1 * | 9/2002 | Schabes et al. | 707/5 |
| 2002/0141584 A1 | 10/2002 | Razdan et al. | |
| 2002/0178447 A1 | 11/2002 | Plotnick et al. | |
| 2002/0194070 A1 | 12/2002 | Totham et al. | |
| 2003/0023598 A1 | 1/2003 | Janakiraman et al. | |
| 2003/0032409 A1 * | 2/2003 | Hutcheson et al. | 455/414 |
| 2003/0078828 A1 | 4/2003 | Basson et al. | |
| 2003/0229507 A1 | 12/2003 | Perge | |
| 2004/0030741 A1 | 2/2004 | Wolton et al. | |
| 2004/0031058 A1 * | 2/2004 | Reisman | G06F 17/30873 725/112 |
| 2004/0059996 A1 | 3/2004 | Fasciano | |
| 2004/0122735 A1 | 6/2004 | Meshkin | |
| 2004/0143600 A1 | 7/2004 | Musgrove et al. | |
| 2004/0186776 A1 | 9/2004 | Llach | |
| 2004/0202291 A1 * | 10/2004 | Skinner | H04M 1/656 379/67.1 |
| 2004/0216157 A1 | 10/2004 | Shain et al. | |
| 2004/0225647 A1 | 11/2004 | Connelly et al. | |
| 2004/0249700 A1 | 12/2004 | Gross | |
| 2005/0010475 A1 | 1/2005 | Perkowski et al. | |
| 2005/0086283 A1 * | 4/2005 | Marshall | 709/200 |
| 2005/0137939 A1 | 6/2005 | Calabria et al. | |
| 2005/0209909 A1 | 9/2005 | Dull et al. | |
| 2005/0234998 A1 | 10/2005 | Lesandrini et al. | |
| 2005/0289067 A1 * | 12/2005 | Lampson | G06F 9/4406 705/51 |
| 2006/0004691 A1 | 1/2006 | Sifry | |
| 2006/0004799 A1 * | 1/2006 | Wallender | G06F 17/30884 |
| 2006/0015904 A1 * | 1/2006 | Marcus | G11B 27/034 725/46 |
| 2006/0016904 A1 * | 1/2006 | Caserta et al. | 239/34 |
| 2006/0026067 A1 | 2/2006 | Nicholas et al. | |
| 2006/0029296 A1 * | 2/2006 | King | H04N 1/00244 382/313 |
| 2006/0036641 A1 * | 2/2006 | Brydon et al. | 707/102 |
| 2006/0041562 A1 | 2/2006 | Paczkowski et al. | |
| 2006/0069663 A1 | 3/2006 | Adar et al. | |
| 2006/0094506 A1 | 5/2006 | Tarter et al. | |
| 2006/0111967 A1 | 5/2006 | Forbes | |
| 2006/0116930 A1 * | 6/2006 | Goldstein | G06Q 30/02 705/14.49 |
| 2006/0123053 A1 | 6/2006 | Scannell, Jr. | |
| 2006/0129446 A1 | 6/2006 | Ruhl et al. | |
| 2006/0143158 A1 | 6/2006 | Ruhl et al. | |
| 2006/0167784 A1 | 7/2006 | Hoffberg | |
| 2006/0178918 A1 | 8/2006 | Mikurak | |
| 2006/0195863 A1 | 8/2006 | Whymark | |
| 2006/0212350 A1 | 9/2006 | Ellis | |
| 2006/0218141 A1 | 9/2006 | Tuttle et al. | |
| 2006/0224452 A1 | 10/2006 | Ng | |
| 2006/0230011 A1 | 10/2006 | Tuttle et al. | |
| 2006/0277105 A1 | 12/2006 | Harris | |
| 2006/0287916 A1 * | 12/2006 | Starr | G06Q 30/02 705/14.46 |
| 2007/0005424 A1 | 1/2007 | Arauz | |
| 2007/0027743 A1 | 2/2007 | Carson | |
| 2007/0053513 A1 | 3/2007 | Hoffberg | |
| 2007/0061199 A1 | 3/2007 | Montgomery et al. | |
| 2007/0067297 A1 | 3/2007 | Kublickis | |
| 2007/0074258 A1 | 3/2007 | Wood | |
| 2007/0089129 A1 | 4/2007 | Verhaegh | |
| 2007/0100688 A1 | 5/2007 | Book | |
| 2007/0112630 A1 | 5/2007 | Lau et al. | |
| 2007/0124756 A1 * | 5/2007 | Covell | G06F 17/30743 725/18 |
| 2007/0143186 A1 | 6/2007 | Apple et al. | |
| 2007/0143345 A1 | 6/2007 | Jones et al. | |
| 2007/0156677 A1 | 7/2007 | Szabo | |
| 2007/0157228 A1 * | 7/2007 | Bayer et al. | 725/34 |
| 2007/0162335 A1 | 7/2007 | Mekikian | |
| 2007/0162926 A1 | 7/2007 | Steelberg et al. | |
| 2007/0185881 A1 * | 8/2007 | Vienneau et al. | 707/10 |
| 2007/0192129 A1 | 8/2007 | Fortuna | |
| 2007/0198344 A1 | 8/2007 | Collison et al. | |
| 2007/0219940 A1 | 9/2007 | Mueller et al. | |
| 2007/0239530 A1 | 10/2007 | Datar et al. | |
| 2007/0239535 A1 | 10/2007 | Koran et al. | |
| 2007/0250901 A1 | 10/2007 | McIntire et al. | |
| 2007/0260520 A1 | 11/2007 | Jha et al. | |

(56) References Cited

U.S. PATENT DOCUMENTS

| | | |
|---|---|---|
| 2007/0266326 A1 | 11/2007 | Evans et al. |
| 2007/0271145 A1* | 11/2007 | Vest ............................... 705/14 |
| 2007/0282684 A1 | 12/2007 | Prosser et al. |
| 2007/0288309 A1 | 12/2007 | Haberman et al. |
| 2007/0288431 A1 | 12/2007 | Reitter et al. |
| 2008/0004947 A1 | 1/2008 | Mathew et al. |
| 2008/0033587 A1 | 2/2008 | Kurita et al. |
| 2008/0033736 A1 | 2/2008 | Bulman |
| 2008/0033776 A1 | 2/2008 | Marchese |
| 2008/0033790 A1 | 2/2008 | Nickerson et al. |
| 2008/0033806 A1 | 2/2008 | Howe et al. |
| 2008/0034314 A1 | 2/2008 | Louch et al. |
| 2008/0040175 A1 | 2/2008 | Dellovo |
| 2008/0052541 A1 | 2/2008 | Ginter et al. |
| 2008/0059208 A1 | 3/2008 | Rockfeller et al. |
| 2008/0059286 A1 | 3/2008 | Nickerson et al. |
| 2008/0059288 A1* | 3/2008 | Kokernak ............. G06Q 30/02 705/14.41 |
| 2008/0065491 A1 | 3/2008 | Bakman |
| 2008/0077574 A1 | 3/2008 | Gross |
| 2008/0082410 A1* | 4/2008 | Zhou ..................... G06Q 30/02 705/14.41 |
| 2008/0086368 A1 | 4/2008 | Bauman |
| 2008/0086432 A1 | 4/2008 | Schmidtler et al. |
| 2008/0090551 A1 | 4/2008 | Gidron et al. |
| 2008/0091516 A1 | 4/2008 | Giunta |
| 2008/0103886 A1 | 5/2008 | Li et al. |
| 2008/0109285 A1 | 5/2008 | Reuther et al. |
| 2008/0120325 A1 | 5/2008 | Davis |
| 2008/0126178 A1 | 5/2008 | Moore |
| 2008/0126476 A1 | 5/2008 | Nicholas et al. |
| 2008/0140502 A1 | 6/2008 | Birnholz et al. |
| 2008/0154625 A1 | 6/2008 | Serbanescu |
| 2008/0162281 A1* | 7/2008 | Davis ................. G06Q 30/0242 705/14.41 |
| 2008/0167957 A1 | 7/2008 | Steelberg et al. |
| 2008/0168135 A1* | 7/2008 | Redlich et al. ............... 709/204 |
| 2008/0172293 A1 | 7/2008 | Raskin et al. |
| 2008/0183806 A1 | 7/2008 | Cancel |
| 2008/0189169 A1* | 8/2008 | Turpin et al. ................... 705/10 |
| 2008/0201159 A1* | 8/2008 | Gabrick et al. ................. 705/1 |
| 2008/0209001 A1 | 8/2008 | Boyle et al. |
| 2008/0215474 A1 | 9/2008 | Graham |
| 2008/0235087 A1* | 9/2008 | Amento ................. G06Q 30/02 705/14.54 |
| 2008/0235104 A1* | 9/2008 | Chow .................. G06Q 20/102 705/27.1 |
| 2008/0243767 A1 | 10/2008 | Naibo et al. |
| 2008/0249855 A1 | 10/2008 | Collins |
| 2008/0255936 A1 | 10/2008 | Ghate |
| 2009/0018932 A1* | 1/2009 | Evans .................... G06Q 30/02 705/301 |
| 2009/0112714 A1* | 4/2009 | Steelberg ............... G06Q 30/02 705/14.65 |
| 2009/0112715 A1* | 4/2009 | Steelberg ............... G06Q 30/02 705/14.65 |
| 2010/0005382 A1* | 1/2010 | Curran et al. ................ 715/220 |
| 2010/0082327 A1* | 4/2010 | Rogers .................... G10L 13/08 704/4 |
| 2010/0131085 A1* | 5/2010 | Steelberg et al. ............... 700/94 |
| 2010/0293057 A1* | 11/2010 | Haveliwala ........ G06Q 30/0269 705/14.66 |

OTHER PUBLICATIONS

Tong, X., Creation of Brand Equity in the Chinese Clothing Market. Dissertation. Graduate School University of Missouri-Columbia, Dec. 2006; http://edt.missouri.edu/Fall2006/Dissertation/TongX-120806-D6156/research.pdf.

* cited by examiner

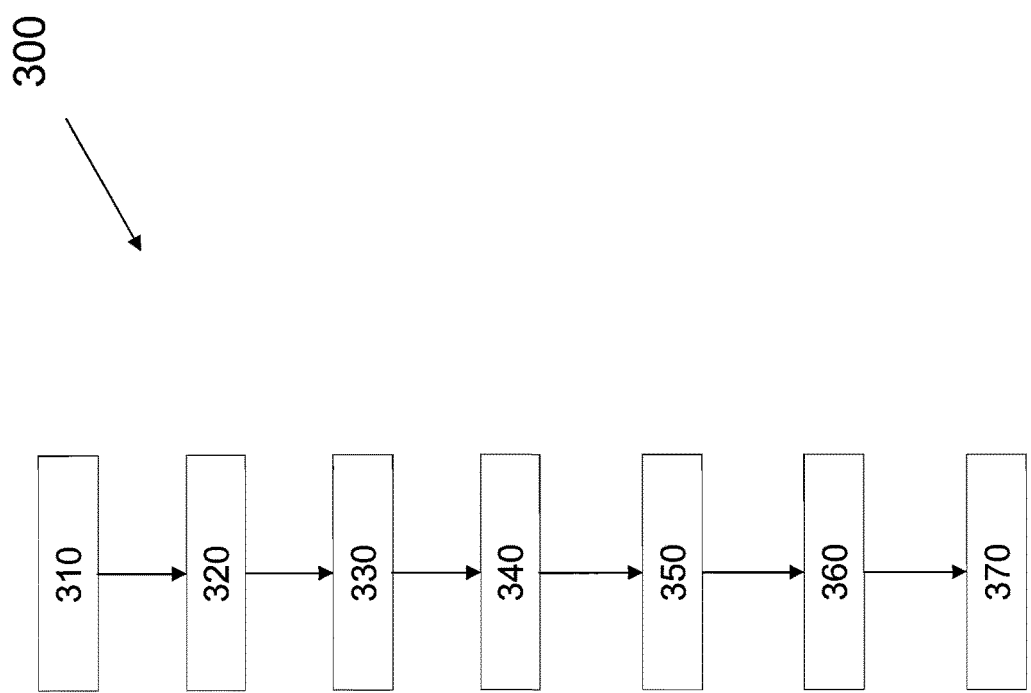

SYSTEM AND METHOD FOR ON-DEMAND DELIVERY OF AUDIO CONTENT FOR USE WITH ENTERTAINMENT CREATIVES

CROSS-REFERENCE TO RELATED APPLICATIONS

This application is a continuation-in-part of U.S. patent application Ser. No. 12/221,058, entitled "System And Method For Distributing Content For Use With Entertainment Creatives Including Consumer Messaging," filed Jul. 30, 2008, which is a continuation-in-part of U.S. patent application Ser. No. 12/220,916, entitled "System and Method For Preemptive Brand Affinity Content Distribution", filed Jul. 29, 2008.

U.S. patent application Ser. No. 12/220,916 is: a continuation-in-part of U.S. patent application Ser. No. 12/144,194, entitled "System and Method for Brand Affinity Content Distribution and Optimization", filed Jun. 23, 2008; claims priority to U.S. Provisional Patent Application Ser. No. 61/065,297, entitled "System and Method of Assessing Qualitative and Quantitative Use of a Brand," filed Feb. 7, 2008; and claims priority to U.S. Provisional Patent Application Ser. No. 61/131,386, entitled "Apparatus, System and Method for a Brand Affinity Engine Using Positive and Negative Mentions", filed Jun. 6, 2008.

U.S. patent application Ser. No. 12/144,194 is: a continuation-in-part of U.S. patent application Ser. No. 11/981,646, entitled "Engine, System and Method for Generation of Brand Affinity Content", filed Oct. 31, 2007; a continuation-in-part of U.S. patent application Ser. No. 11/981,837, entitled "An Advertising Request And Rules-Based Content Provision Engine, System and Method", filed Oct. 31, 2007; a continuation-in-part of U.S. patent application Ser. No. 12/072,692, entitled "Engine, System and Method For Generation of Brand Affinity Content, filed Feb. 27, 2008; and a continuation in part of U.S. patent application Ser. No. 12/079,769, entitled "Engine, System and Method for Generation of Brand Affinity Content," filed Mar. 27, 2008.

U.S. patent application Ser. No. 11/981,837 claims priority to U.S. Provisional Application Ser. No. 60/993,096, entitled "System and Method for Rule-Based Generation of Brand Affinity Content," filed Sep. 7, 2007, and is related to U.S. patent application Ser. No. 11/981,646.

U.S. patent application Ser. No. 12/079,769 is a continuation-in-part of U.S. patent application Ser. No. 12/042,913, entitled "Engine, System and Method for Generation of Brand Affinity Content," filed Mar. 5, 2008, which is also a continuation-in-part of U.S. patent application Ser. No. 12/072,692.

U.S. patent application Ser. No. 12/072,692 is a continuation-in-part of U.S. patent application Ser. No. 11/981,646.

FIELD OF THE INVENTION

The present invention is directed to a creative generation engine and, more particularly, to an engine for on-demand generation and delivery of voice asset-related content, and a method of making and using the same.

BACKGROUND OF THE INVENTION

It is well understood that high impact advertising is that advertising that best grabs the attention of a target consumer. A target consumer is the ideal customer for the particular goods being advertised, from a socio-economic perspective, from a morals and values perspective, from an age or interest level perspective, or based on other similar factors.

The impact on an ideal customer of any particular advertisement may be improved if an advertisement includes endorsements, sponsorships, or affiliations from those persons, entities, or the like from whom the ideal target consumer is most likely, or highly likely, to seek guidance, to identify with, and/or to generally empathize with. More specifically, a customer experiences the greatest impact from advertising, and all aspects of entertainment in general, that the customer can best relate to. Consequently, factors that will typically increase the impact of an asset for inclusion in any type of creative, be it an advertisement or entertainment, include the asset's perceived knowledge of particular goods or in a particular industry of interest to that customer, the frame or popularity of the asset as perceived by that customer, the respect typically accorded a particular asset by those similarly situated to that customer, the identification with the asset by the target customer, and other similar factors.

Consequently, the highest impact advertising time or block available for sale will generally be time that is associated, such as both within the advertisement and within the program with which the advertisement is associated, with an endorser or entertainment most likely to have high impact on the ideal target customer. Similarly, the most expensive entertainment is that which is most likely to have the greatest number of customers interested in, or identifying with, that entertainment. However, the existing art makes little use of this reality.

Thus, there exists a need for an engine, system and method that allows for the obtaining of an asset or assets, such as the provision of advertisements or entertainment having associated therewith the one or more assets, in order to generate the aforementioned high-impact circumstances.

SUMMARY OF THE INVENTION

A method of creating and delivering an on-demand audio asset for inclusion in a creative is described. The method includes the steps of accessing, from a first electrical communication device, a central processing environment via a computerized telecommunications network, then requesting at least one recording of at least a portion of an audio transmission generated from the first electrical communication device, then generating at least one audio asset, wherein the at least one audio asset includes the at least one recording of the at least a portion of the audio transmission, then adding the at least one audio asset to a pool of related assets stored in a vault that is connected to the central processing environment via the computerized telecommunications network, then selecting, from the pool of audio assets in the vault, the at least one generated audio asset and at least one other related asset from the pool of related assets to form a creative, then requesting delivery of the creative to a second electrical communication device, and finally delivering the creative to the second electrical communication device via the computerized telecommunications network.

A creative composition engine is also described. The engine includes a central processing environment that includes at least one processor, a digital recorder and a digital asset storage vault, wherein the digital recorder records at least a portion of an audio transmission from a first electrical communication device connected to the central processing environment via a computerized telecommunications network, for inclusion into a pool of related audio assets stored in the vault, and wherein the central processing environment generates a creative comprising the at least one recording and at least one other related asset from the pool for delivery to a second electrical communication device.

BRIEF DESCRIPTION OF THE FIGURES

The present invention will be described hereinbelow in conjunction with the following figures, in which like numerals represent like items, and wherein:

FIG. 3 is a flow chart illustrative of a method for generating an on-demand audio asset for inclusion into a creative, according to an aspect of the present invention.

DETAILED DESCRIPTION OF THE INVENTION

Figure 1:
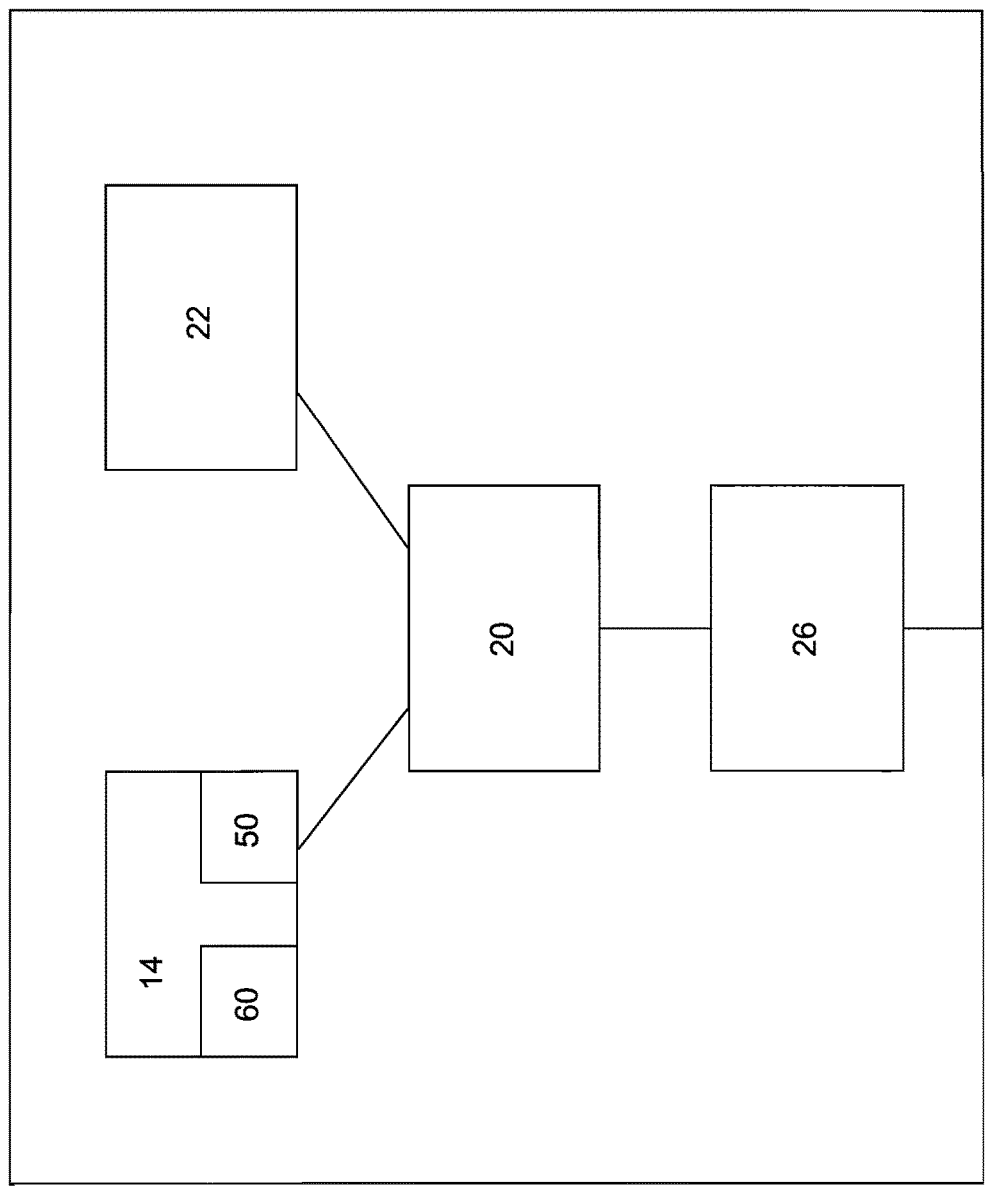
FIG. 1 illustrates an exemplary embodiment of aspects of the present invention.

It is to be understood that the figures and descriptions of the present invention have been simplified to illustrate elements that are relevant for a clear understanding of the present invention, while eliminating, for the purposes of clarity, many other elements found in typical computing engines, systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

As used herein, a "creative" is and includes, for example, an advertisement, a form of entertainment, or the like, and a creative may preferably be composed, for example, from one or more media assets of interest to the composer of the creative. The media assets typically include media assets that are, or are related to, other assets, such as: snippets of movies or television, or of celebrities in movies or television; audio, video or stills showing celebrities or sports figures; photos or video of well known locales, animals, etc. In the instant invention, the media assets may be used exclusively to generate the composed creative, or the media assets may be added to other assets, or placed with other items in a per-existing template, to generate the composed creative.

It is generally accepted that a creative having the highest impact on the desired consumer base includes relationships, endorsements, sponsorships, or affiliations from or to those persons, entities, things, or the like to whom the targeted consumers most relate, such as based on the endorser's knowledge of particular goods or in a particular industry of interest to the subject consumer, the frame of an entertainment media asset as understood by the subject consumer, the respect or desirability typically accorded a particular asset, and other similar factors. For example, the easiest manner in which to sell advertising time or blocks of advertising time is to relay to a particular advertiser that the advertising time purchased by that advertiser will be used in connection with an audio visual work that has an endorsement therein for that particular advertiser's brand of goods or services, thus implying that the advertiser's goods or services are already endorsed by the composer of the subject audio visual work. As used herein, such a relationship, endorsement, sponsorship, or affiliation with another asset within a creative may include an assertion of use of a particular good or service by an actor, actress, or subject in the audio visual work, reference to a need for a particular types of goods or services in the audio visual work, or an actual endorsement of the use of a product within the audio visual work, for example.

An allowable relationship, endorsement, sponsorship, or affiliation may be limited in certain ways, as will be apparent to those skilled in the art. Such limitations may include: geographic limitations on the use of particular assets (for example, endorsers are more likely to endorse locally in various locales rather than nationally endorse, in part because national endorsements bring a single endorsement fee and generally preclude the repetitious collection of many smaller fees for many local endorsements), or limits on the use of certain assets with certain other assets; or limitations on use in particular creatives or industries, such as wherein a different product, different service, different industry, or competitive entertainment is or may be endorsed, related, sponsored or affiliated (such as in a different geographical area) by the same asset relationship, endorser, sponsor, or affiliate; or limitations on relationships, endorsements, sponsorships, or affiliations solely to a particular field(s) or type(s) of product, service or entertainment. For example, certain media assets may be employed only with regard to certain offerings, such as wherein certain movie snippets are made available only to those composers who wish to generate creative showing their respective avatars in that/those movie snippets.

Further, asset relationships, endorsements, sponsorships, or affiliations by particular endorsers may be limited to products, brands or products or services, types of products or services, or the like which are approved by one or more entities external from, but affiliated with, the specific endorser. For example, the National Football League may allow for its players only to endorse certain products, brands of products, types of products, or the like, that are also endorsed by the NFL, or may only allow use of video or audio related to NFL games or players only in certain circumstances, with certain brands, in certain advertisements, or in certain product offerings.

More specifically, as used herein, relationships, endorsements, sponsorships, or affiliations may include: endorsements or sponsorships, in which an individual or a brand may be used to market another product or service to improve the marketability of that other product or service; marketing partnerships, in which short term relationships between different products or services are employed to improve the marketing of each respective product or service; brand affinity, which is built around a long term relationship between different products or services such that, over time, consumers come to accept an affinity of one brand based on its typical placement with another brand in another industry; creative asset relationships, in which two or more creative assets are, at some point between inception and delivery, combined to generate a creative that is saleable, marketable, or an advertisement; and the like.

At present, there is a need for a platform or engine to allow for the composition of a creative employing one or more assets in any of the above circumstances, wherein the asset(s) relate to, for example, a specific individual, a specific entity, an affinity brand, a marketing partner, a sponsor, a well known media asset, such as a movie or television show, or the like. In the present invention, a creative engine 10, such as that illustrated in FIG. 1, may include a vault 12 that provides media assets 14 and integration of media assets, in one or more instances without need of involving the media assets for permission, a recommendation engine 20 that may, by creative, by market, by brand affinity, by user request, or otherwise match media assets from the vault with a request for a creative 22, and a delivery engine 26 capable of integrating the requested creative 22 and the one or more media asset 14 from the vault 12. The delivery engine may, for example, be apart from the vault and recommendation engine, either in control, in software, in location, and the like, and may allow for pre-binding, binding at request, or late stage binding of the creative 22 and media asset 16, and delivery of the creative 22 bound with the dynamic media asset 16 from the vault to an advertiser, an advertising server, an entertainment customer/purchaser, or the like. As such, the delivery engine may generate the mash up of the creative and the media asset(s), or may receive the mash up for delivery. Creative requests 22 may be made via an "wizard" using templates, as will be apparent to those skilled in the art.

The vault captures certain media assets, and/or information related thereto, in a common location, such as a common database, such as, for example, all major league baseball past and present players, including statistics, video, and pictures of those players affiliated with the names of those players, in addition to any endorsement limitations on those players. The vault may likewise include media assets that may be associated with audio-visual works. The vault may include video, audio, photographs, text and text/SMS messages, symbols, emblems, taglines, pictures, video, press releases, publications, web links, web links to external content, and media capable of re-purposing (such as an athlete running in front of a blue screen, wherein the athlete may be re-purposed by the placement of a background over the blue screen), and voice.

At least one of the vault and the recommendation engine may also include one or more rules associated with each of the media assets, such as exclusions, inclusions, or preferences 50 for the use of the media asset or particular items of information associated with the media asset in the vault. Such inclusions, exclusions, or preferences may include geographic limitations on certain information items or endorsements, product limitations, preferred partners or products or product types for endorsement, preferred or allowed uses, etc. Exclusions may, of course, be necessary if the requested creative conflicts with other legalities, such as a pre-existing endorsement agreement for the requested brand with a competitor, or the like.

Further, media assets in the vault may be marked with different payment schema 52 based on the requester of the media asset, the request itself, the creative into which the requested asset will be incorporated, the requested overall creative including the asset, or the ultimate use or market for the creative created, for example. For example, in the event the creative requester is a school, or a student at a school, and the requested creative is not an advertisement or like endeavor to sell anything, media assets may be made available for use for free. Such exceptions may be made, with regard to payment, with regard to any level of payment variation as between any number of different user and/or use types, such as non-profit, for-profit, individual, corporate, in-home, in-business, advertisement, entertainment, and the like. Additionally, for example, icons of a favorite football player may be requested by a non-profit individual for at-home use, to be overlayed over a live football program then on that individual's television, at no charge, or minimal charge to that individual. Likewise, assets may be provided to allow a user to create a widget, or like entertainment item, wherein the user, or a user avatar, is placed into a well-known audio or video environment, or wherein the user, or the user avatar, is placed into a video game, or classic video game, for example, and such situations may allow for a variable charge to be levied on the user based on the media asset requested by the user, the use of the ultimate creative including the requested media asset, the identity of the requesting party, or the like.

The recommendation engine 20 may assess, based on numerous factors including external factors, the media assets that are most sensible, or that are available, for a particular requested creative. For example, such a recommendation engine may gauge proper matches by assessing inclusion and exclusion rules based on the aforementioned factors in the vault, such as geography, but additionally can use stored or external information and/or variable factoring to do associations for any two media assets, such as association between two different brands (such as wherein brand associations already exhibiting brand affinity would have the highest percentage association, and brands which would make the most sensible association would also exhibit higher percentage matching for brand association), or to do matching of a media asset based on the target consumers or creative requester of the requested creative.

For example, a "profile" 60 may be developed in the vault for a particular asset. Such a profile may include any of a myriad of information, both stored in the vault and/or having external references outside the vault from within the vault. For example, in the event the requested creative is an advertisement, the profile may include but not limited to psychological profiles of typical users of a brand that is the profiled asset (which may include values, motivations, wants, and needs of brand users, and which may be assessed based on inferences from online, credit card, or television use by those users, for example), brand profiles of that asset including target customers, target affiliate profiles (which may include reasons for desired affiliation, such as sharing marketing costs, increasing brand recognition in certain geographies or fields of use, distribution channel access, expedited market entry, or improved brand perception, for example), and the like, and such profiles may be used as media assets by the recommendation engine in order to develop a best match.

As an additional example with regard to advertising, polling may provide for local or national focus and be maintained in the vault as an associated media asset with a particular brand, and best matches for certain brands may be selected according to such polling results. For example, a "flashy" sports personality may be a best match for a brand offering in Los Angeles, but a different athlete's endorsement might be preferably to sell that brand in the mid-west. Such information, including "who's hot", or where a brand is "hot", may be associated with the media assets regarding that brand in the vault, and may be thus used by the recommendation engine to do matching.

Similarly with regard to non-advertising embodiments, the vault of the present invention may include assets uniquely associated with particular users/consumers. For example, a user may enter an avatar to the vault as a media asset to be associated with, and/or form part of, the user's profile. Additionally, the user need not incorporate an externally created avatar in the instant invention, but rather may create an avatar using the present invention as a media asset for inclusion in the vault. Similarly, the user may use tools provided in the present invention to create or upload a variety of media assets, such as widgets, personal audio, photos, text messages, and/or videos, to the vault in the present invention for use as media assets in generating a creative in union with other vault assets. Needless to say, such "personal" vault assets may have access limited by the uploading or creating user, wherein such access may be limited to the creator, or to a circle or parties or entities authorized by the creator, or to all individual users of the vault, or to all corporate users of the vault, or to all non-profit users of the vault, etc.

Thus, in the aforementioned exemplary embodiment, the present invention may allow for the creation of avatars. Such avatars may be used with other media assets within, or accessible to, the vault, as creatives, or may constitute purchaseable creatives in their own right, for example. For example, a user of the system may create an avatar for him/herself, and/or may create an avatar incorporating or based on a brand or personality. In the latter exemplary embodiment, for example, the subject brand or personality may allow to be resident in the vault a series of authorized media assets that may be used by users to generate creatives constituting, at least in part, the aforementioned avatar(s) The avatars may thus be used, such as in conjunction with other assets or associative asset information in the vault, in the furtherance of brand recognition for the creation of brand affinity with the subject brand or personality. Needless to say, a user may request a creative that is a composition including multiple assets in the form of avatars, or like assets, such as wherein the user's avatar is shown in an entertaining video meeting up with, and marrying, an avatar of Brad Pitt, for example.

Although an avatar may be generated using software in various ways, as will be understood by those skilled in the art, in one such methodology the user may upload one or more images into the vault as an asset(s) for use/manipulation, such as use/manipulation in generating a creative for purchase in the form of an avatar. The images may be uploaded from an existing photograph, for example, or may be imported from a camera or a video camera attached to, or accessible via, a user interface, or through other electronic media. Once such images are uploaded, the user may for example, crop portions of the photographs to be used as to create the avatar. The avatar portion may include, for example, a particular portion of a face within the uploaded images and/or the body and face from the uploaded images. The images may also be cropped to capture only those portions relevant to the avatar of interest in the requested creative. Once the cropped portions of the uploaded images are selected, an avatar creation engine may process the images and create an avatar based on the selected portion of the uploaded image.

For example, the present invention may, via software, use the multiple available cropped images to generate a three dimensional estimate of certain points of interest on the cropped images to allow for preparation of the avatar. Such points of interest may include, for example, certain facial contours, wherein such points of interest may be calculated relative to other points of interests, such as other facial feature. Needless to say, the availability of multiple images, likely at least slightly different angles, improves the availability of relative calculations of facial or other relative points of interest, although the present invention may be similarly employed with the uploading of only a single image.

In an exemplary embodiment, the most prominent point, such as the tip of the nose, may be selected, and the position of the tip of the nose versus some predetermined number of other points of interest, such as five other points of interest, may then be assessed, such as by using a mathematical relation between the points of interest assessed as among the multiple uploaded, cropped images. Thereby, in this exemplary embodiment, the mathematical relation between multiple points of interest allows for the generation of a three dimensional avatar model in accordance with the proportions of the user's real physical facial features. Needless to say, certain facial features may be added or modified, either upon generation of such an avatar or thereafter. For example, upon review of a generated avatar, a user may decide that she wishes her eyes to be wider, or may select a blue color for her eyes. The avatar so generated may then be animated in any way desired by the composer, including for use in requested creatives with other available or allowable media assets in the vault, such as well known movie scenes, television shows, video games, music videos, virtual worlds, or still photos, for example.

By way of further example, if the uploaded portion includes only the face of the target avatar, the software of the present invention may further allow the user to add various aspects of the avatar body, face and/or accessories, including but not limited to hair, hats, tee shirts, pants, shoes, and the like. More specifically, the avatar produced may be created in at least two forms, such as the general facial area of the user, and/or the face and a body portion. As discussed hereinabove, an avatar may also be imported into the present invention from a third party source, wherein such avatar may already be developed. By way of example, the person who has created an avatar in an existing social network to represent herself may import that avatar into the vault of the present invention.

An avatar imported or otherwise created in the vault may be further manipulated and/or otherwise be incorporated with other media assets from the vault, as discussed hereinthroughout. Such manipulations may include, for example, changing the color, size and shape of aspects of the avatar or, for example, creating a sketch look, hazed look, a blocked face look, or the like for the avatar. Of course, some variations, modifications, or incorporations may be precluded or not compatible in accordance with the aforementioned rule set governing the use of media assets.

As discussed hereinabove, the present invention may include one or more vaults which may contain various creatives and/or media assets, whether or not generated by the present invention or downloaded or otherwise obtained from external locations or from third parties. Such media may include for example, movies, television shows or famous sporting events, by way of non-limiting example. As mentioned hereinabove, the present invention may allow for the interaction between such vaulted media assets and at least one avatar in a requested creative. More specifically, such interaction, for example, may include the super-imposing of the avatar into a particular piece of vaulted media asset. By way of example, an avatar created in accordance with the present invention may be uploaded into an episode of "Friends." In this case, for example, the avatar may be super-imposed within the television show as an inert object, have interaction with the scene, or interact directly with the characters of the show.

By way of further non-limiting example, an avatar consisting of just facial features may be super-imposed on a media asset available within the vault. More specifically, for example, the vault media may contain a still photo or video of Tug McGraw during the 1980 baseball World Series throwing the last pitch to win the only World Series in the history of the Philadelphia Phillies. The user may then insert his or her facial avatar onto the body of Tug McGraw in the photo or video, thereby creating a new video showing the avatar winning the 1980 World Series. Of course, such a requested creative might make for a good gift, such as after incorporation of such an avatar into the 1980 World Series, wherein the avatar corresponds to a son or daughter, for delivery as an online "birthday card" or birthday email to that son or daughter.

The vault may also contain media specifically designed for use with avatars, whether created or imported by the user. Such media may include, for example, generic video of reality upon which an avatar may be inserted or, by way of further example, a cartoon depiction of life events. Although innumerable examples exist, the present invention allows for the interaction of avatars with such media assets, whether or not the media assets and/or the avatars originate at the vault of the present invention.

In yet further exemplary embodiments, avatars and avatar interactive media may be saved by the user to the vault, uploaded or downloaded locally, or accessed through or as part of a widget, among myriad other examples. Such a widget may take the form of an access key which, for a fee, would allow for the display or downloading of the avatar or avatar interactive media as a creative to a desktop, for example. For example, an episode of "Friends" that includes an avatar as one of the characters in a coffee shop may be shown on the webpage of the user who is the subject of the avatar on the social network page of that user through the use of a widget. Access in this fashion may be charged as a one time fee, or may be time based, or per diem or periodically based, for example. Such a creative may also be accessed, for example, by mail order DVD or on-demand cable services, among many other access methodologies, for example.

Multimedia Messaging Service (MMS) is a standard for telephone messaging systems that allows sending messages that include multimedia objects (images, audio, video, rich text), as well as text, such as in Short Message Service (SMS). MMS and SMS are used herein to refer to all similar text, data and multimedia systems known to those skilled in the art. MMS is typically deployed in cellular networks, along with other messaging systems like SMS, Mobile Instant Messaging and Mobile E-mail. The principal standardization effort for MMS is done by 3GPP, 3GPP2 and Open Mobile Alliance (OMA).

Text messaging, such as MMS/SMS, is used by people to send short messages usually from person-to-person. Picture messaging has become more and more popular now that cell phones often have built in or attachable cameras to enable people to send picture messaging back and forth. Picture messaging is made possible through the MMS system via its support of all kinds of photos, graphics, animation, as well as video and audio clips. Thus, in the exemplary embodiments herein, MMS and like systems allow the sending and receiving of any type of multimedia messages. Further, such systems have been designed to work with mobile packet data services such as GPRS and 1x/EVDO.

MMS-enabled mobile phones may thus enable subscribers to compose and send messages with one or more multimedia parts. Multimedia parts may include text, images, audio and video. These content types should conform to the MMS or similar Standards. For example a phone can send an MPEG4 video in AVI format. Mobile phones with multimedia capabilities, such as with built-in MP3 players, are very likely to include an MMS messaging client—a software program that interacts with the mobile subscriber to compose, address, send, receive, and view MMS messages. MMS and/or an MMS client may thus be used by various companies to suit different solutions. For example, using a Mobile Photo Sharing Platform called Mobshare, sports photos are broadcasted to thousands of fans directly on their mobile phones.

MMS and like or associated types of consumer messaging may be provided through the system of the present invention. For example, voice profiles may be included with the vaulted assets of the present invention, such as to provide a celebrity wishing a happy birthday to a friend. The celebrities' voices may be modified to pronounce almost anything based on the base voice profile, such as the name of the person to whom the aforementioned birthday wish is sent, as will be understood by those skilled in the art. Such a modification may also be performed using names selectable from a list, such as numerous available names previously pronounced by the celebrity and made available via a drop down menu or search, for example. As would be understood to those possessing an ordinary skill in the pertinent arts, other greetings may also be sent, such as teasing or bad wishes, for example. Limitations may be included within the system to prevent the use of explicit wishes, either favorable or unfavorable, and may also be used to limit the use of certain celebrities with certain wishes via the aforementioned vault rules, for example. Such disassociation of celebrities with wishes/causes/holidays may be provided to prevent abuse of an consumer messaging, to prevent the injury to the celebrity persona and name, and/or to prevent support of causes or brands contrary to those generally supported by that celebrity. Needless to say, this exemplary embodiment is readily modifiable to likewise employ celebrity or famous video, avatars or pictures, for example.

As contemplated herein, voice profiles, and all voice or audio assets associated with a celebrity or other individual or character, may be generated by direct recording of entire messages, portions of messages, or may be constructed via a voice snippet database, or may further be synthesized voice data.

For example, in the creation of a voice snippet portfolio, a text selection system as understood by those skilled in the art may analyze text from a variety of sources and assemble an optimal text set that may then be read by the celebrity. The text selection system may further incorporate existing assets to more efficiently determine what textual material has already been recorded, and thereby eliminate redundant, unwanted or undesired voice snippet data by not pursuing such data. The celebrity's speech may then be labeled according to the text to be read and the individual voice assets may then be extracted from the recorded speech for use in constructing a recorded snippet asset database. These assets may further be associated with text-to-speech synthesizers, as described herein.

The text selection system may analyze any source of text that is readable or transmittable by computer over a network. Thus, the networked system as contemplated herein may be used to identify and download text from any source within the vault or externally, including electronic dictionaries, digitized works of literature, technical reports and the like.

Text may be run through a text parser or similar program that breaks the text into individual syllables, words and/or phrases. The text parser may further examine any whitespace between words and the punctuation to identify individual words and phrases within input text. As may be understood by those skilled in the art, the text parser may further include a set of grammatical rules to identify phrases based on parts of speech.

After all parsing is completed, the text may be run through a word analysis program that may employ a lexicon, word decomposition algorithm, or the like, to break up all words and phrases into their constituent phonemes. For example, the word decomposition algorithm may examine individual letters in each word and phrase to identify vowels and consonants. Likewise, the word analysis program may consider not only a single letter but also its neighboring letters to determine what the correct phoneme assignment should be. Because there may be variation in the pronunciation of words based on the location of those words in a sentence, the system may selectively exclude those words from being used to develop an optimal text set. For example, flags associated with certain words and phrases may be inserted into the resulting analysis based on the context of where that word or phrase appears in the any sentence, such that flagged voice data may be excluded, or alternatively, used for special purposes.

Once the phonemes have been extracted from the words and phrases, they may be sent to a sound analysis program to identify the constituent sound units found within the generated phonemes. The sound analysis program may use phoneme information to identify all individual sound units. If a synthesizer is to be used, the ultimate constitution of the sound units may depend on the nature of the synthesizer. For example, the synthesizer may use syllables, demi-syllables, pairs of half syllables, or the like. Otherwise, the sound analysis program may take the phonemes and identify how they may be grouped into the sound units of choice. In doing so, the sound analysis program may further keep track of the context of the sound units. That is, the sound analysis program may identify not only the sound unit, but also its neighboring sound units. As explained above, this may allow the system to flag text where particular sound units may vary by the pronunciation effects of their neighboring sound units. Thus, all sound units associated with a celebrity profile may be stored in the vault so that a record of phonetically important neighboring sound units is maintained.

The sound analysis program may further incorporate a set of exclusion rules whereby certain sound units are excluded from contributing to the final text database. The exclusion rules may rely on the flagging function as described above, and thus may avoid words or phrases that lie at certain locations within the sentence. Exclusion rules may also reject accented syllables, as such syllables tend to provide lower quality sound units for use with text-to-speech synthesizers.

In addition to generating text for celebrities to read aloud, the present invention may also be used to process prerecorded voice data that is accompanied by a corresponding text. For example, a prepared speech, or books-on-tape recordings may be used as source material of both the recorded speech information and the corresponding text associated with that speech. As contemplated herein, the best or most reliable examples of this recorded speech may be used, and gaps or holes in the voice asset portfolio may be identified and filled as described herein. Upon finalized creation of all textual information, recordings of all such text may be made as is understood by those skilled in the art, and those digitized or recorded voice assets may be stored in the vault for any such use as contemplated herein. Preferably, these created audio assets are pooled with or otherwise associated with related assets for that celebrity, such that the recommendation engine described herein may efficiently select those assets required in the generation of any particular requested creative.

In another embodiment, synthesizers may be used to generate voice snippet data for a celebrity voice asset portfolio. Synthesis may be based on the stringing together of segments of recorded speech, to produce natural-sounding voice data. For example, unit selection synthesis may use those voice assets associated with a celebrity voice portfolio, such that the desired target utterance is created by determining the best chain of candidate assets (such as phrases, words, syllables or phonemes) from the portfolio. Such a process is typically achieved via use of a weighted decision tree mechanism, as may be understood by those skilled in the art. Any text selected for a celebrity to read may be used with a synthesizer to adapt to the voice quality and characteristic particular to that celebrity. Likewise, and without limitation, the present invention may utilize any voice asset created and stored by the present invention, and may utilize such voice assets in any synthesis process, such as diphone synthesis, domain-specific synthesis, formant or rules based synthesis, articulatory sysnthesis, hidden Markov model synthesis and sinewave synthesis, for example, as may be understood by those skilled in the art.

As contemplated herein, voice data, incorporating full or partial length recordings, voice snippets and/or synthesized voice data, may be duplicated and digitized by system processors and may be placed into packets for transmission over the network, and likewise stored as accessible assets in the vault. The assets may then be available for playback via devices as described herein.

Further, simplistically, voice data in the vault for a given celebrity may include a full script, read by a celebrity, such as outright endorsing a certain product, or such as endorsing a type of product but not a specific brand. In the latter instance, the voice script may then be used in conjunction with a separate reference to a certain brand, or in conjunction with a synthesized vocalization of the specific brand as discussed hereinabove.

Figure 2:
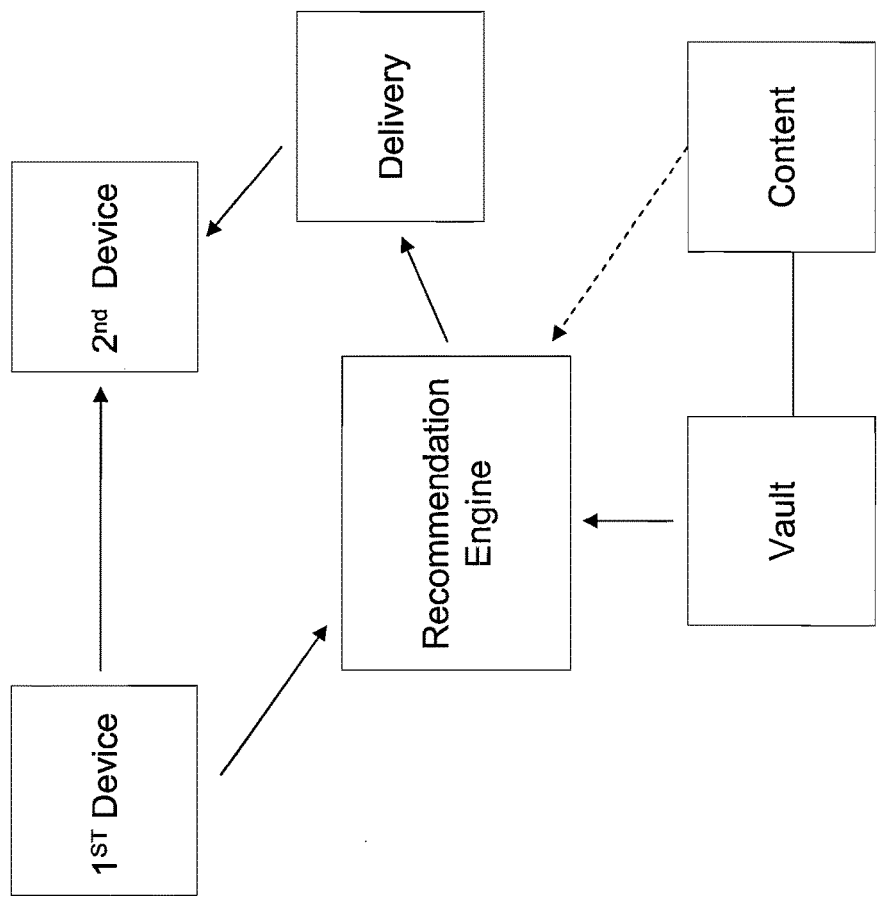
FIG. 2 illustrates a consumer messaging system according to an aspect of the present invention.

Referring now to FIG. 2, there is shown a consumer messaging system according to an aspect of the present invention. As may be seen in FIG. 2, there is a first device, a second device, and the recommendation engine, vault, content and delivery discussed hereinthroughout. While the discussion herein will focus on an example wherein the consumer messaging occurs from one-to-one, separate examples of one-to-many may also be included. As shown in FIG. 2, the first device, such as a cellular phone, pager, personal computing device, or the like, is directed to send a consumer message to a second device, such as a cellular phone, pager, personal computing device, or the like. In this scenario, the user of the first device may want to deliver to the user of the second device a happy birthday message from Madonna, for example. According to an aspect of the present invention, the first device couples to the recommendation engine with a request for a happy birthday message from Madonna. The recommendation engine, as described herein throughout, interacts with the vault and content to recommend a happy birthday message that meets the desired criteria. This message may include Madonna's voice modified to say the second user's name to be included within the birthday wish. Once recommended and selected, the birthday wish may be delivered to the second device using the consumer messaging and/or network of or associated with the present invention. The system of the present invention may employ pre-binding, late binding and sponsoring page/content dynamically delivered in delivery/creating the happy birthday wish.

In light of these examples relating to FIG. 2, such embodiments of the present invention effectively provide a centralized on-demand recording and playback mechanism that may be incorporated into or run seamlessly with the recommendation engine and its respective hardware and network. In this way, the on-demand recording and playback mechanism may also utilize all features of the aforementioned system described hereinthroughout, including use of a MMS or otherwise in conjunction with any public switched telephone network and private branch exchange. In other embodiments, the recording mechanism may operate via the communication device, such as a mobile phone or a VoIP enabled phone. In these embodiments, the recorded and digitized asset may simply be transmitted to system servers for further processing and storage in the vault. For example, a VoIP recording phone may perform an on-demand recording function to process and send all voice data to the system servers without going through a centrally located exchange device. The recording phone may also obtain call control information without involving a centrally located exchange device.

As shown in FIG. 3, the present invention also includes a method 300 of creating and delivering an on-demand audio asset for inclusion into a creative. For example, method 300 beginning at step 310, which involves accessing a central processing environment (e.g. a server or set of servers,) from a first communication device (e.g. a cell phone, pda, laptop, etc.) through a computerized telecommunications network. Next, at step 320, a request is made for a recording of at least a portion of the audio transmission generated from the first communication device. Next, at step 330, at least one audio asset is generated from the recording of the audio transmission. At step 340, the audio asset is added to a pool of assets stored in the vault, which is connected to the central processing environment via the telecommunications network. Related assets may be, for example, additional audio assets from the same celebrity. At step 350, the generated audio asset and at least one other related asset from the pool of related assets is selected for inclusion into a creative. Next, at step 360, a request is made to deliver the creative to a second communication device. The second communication device may alternatively be the same as the first communication device, but naturally this must be subsequent to the earlier steps of method 300, and therefore must be a different point in time from which the first communication device is being used in a prior step of method 300. Lastly, at step 370, the creative is delivered to the second communication device via the telecommunications network.

In one exemplary embodiment, and in light of FIG. 3, a voice recording may be performed as follows. After a voice session is established, the user may request that a recording begin. Initiation of the recording function may occur at any time during the voice session, such that the entire session may be recorded, or only portions of the session may be recorded. Recording sessions may also be intermittent, such that recording may occur multiple times during a single voice session. Initiation of recording may be made by the originator of the voice session, by another party to the voice session or by another party having access to the voice session data, or by a computing terminal also having access to the voice session data. Voice data may be packetized by the phone and sent to system servers to tentatively hold the stored information. Other forms of data transfer are also contemplated herein, such as all those that are commonly used by those skilled in the art, such as frames, raw data, or tokens, for example. At any time during the voice session and up until the session is terminated, the user of the phone may request that the recorded information of the voice session be saved for later use by the system, by initiating a save request. To initiate the save request, the user may only need to push a predetermined button on the phone, provide a voice command to save, or utilize other user interfaces to send the save request. Alternatively, a second party, who may also be actively on the voice session, or is otherwise provided access to the voice session data, may initiate the save request. Since packets are used as a transport means for information exchange, it should be understood by those skilled in the art that all other suitably enabled phones may send a signal to request a conversation session to be saved. It should also be understood that the user of the recording system may be a computer terminal that can communicate with the original phone of the voice session that is being recorded. Upon receiving the instruction, the server may store all or any portion of the held voice data in the vault for future retrieval and transmission, and for inclusion into a requested creative, and described above. If a save request is never initiated before the end of the voice session, the voice data tentatively stored by the server may be deleted when the voice session ends. Alternatively, the system may initiate a message to the original phone user or any other interested party to confirm that a save request was not made, and provide any number of additional opportunities for subsequent saving. In this manner, regardless of when the save request is initiated, the entire communication of the voice session is available for playback. In further embodiments, two or more people may record peer-to-peer conversation with or without involving a centrally located exchange. The present invention as described above thus provides an improved method for allowing all or portions of a voice session, and other streams of analog or digital data to be recorded when a triggering event to record the data is initiated during the transmission.

Effectively, the aforementioned method 300 is performed by a creative composition engine, which forms part of the engine as shown in FIG. 1 and described herein. The engine may thus include a central processing environment that includes at least one processor, a digital recorder and a digital asset storage vault, wherein the digital recorder records at least a portion of an audio transmission from a first electrical communication device connected to the central processing environment via a computerized telecommunications network, for inclusion into a pool of related audio assets stored in the vault, and wherein the central processing environment generates a creative comprising the at least one recording and at least one other related asset from the pool for delivery to a second electrical communication device.

Further, the present invention may also be used to deliver pictures and/or movies, for example, as referenced hereinabove. In such a configuration the present system may be able to send a message to a up and coming baseball player by integrating that up and coming baseball player into his favorite movie, Field of Dreams. Using this technique, a picture or multiple pictures of the up and coming baseball player may be added into the motion picture Field of Dreams and then delivered to the device of the up and coming baseball player.

As will be apparent to those skilled in the art, the engines of the present invention may draw on any number of communication access points and media sources, including wired and wireless, radio and cable, telephone, television and internet, personal electronic devices, satellite, databases, data files, and the like, in order to increase media asset content in the vault, contribute media asset content to the vault, and to best allow for recommendations and delivery.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention as set forth in the claims hereinafter.

The invention claimed is:

1. A computer implemented method of creating in and delivering on-demand audio asset from a central processing environment for inclusion in a creative, comprising the steps of:
   accessing, by a first processor associated with a first electrical communication device, the central processing environment via a computerized telecommunications network;
   requesting creation of at least one recording of at least one portion of an audio transmission generated from the first electrical communication device into the central processing environment in accordance with at least one parameter provided by the first electrical communication device, wherein the at least one parameter is indicative of the creative and comprises payment schema;
   in response to the requesting, generating at least one audio asset in the central processing environment, wherein the at least one audio asset includes the created at least one recording of the at least one portion of the audio transmission, wherein the at least one recording is created within the central processing environment;
   synthesizing a first audio asset based on the generated at least one audio asset for inclusion in the pool of related assets, wherein the synthesizing the first audio comprises identifying constitution of sound units using one of syllables, demi-syllables, and pairs of half syllables, wherein the synthesizing uses at least one exclusion rule to reject accented syllables;
   adding the at least one audio asset and the synthesized audio asset to a pool of related assets stored in a computer implemented vault that is communicative with the central processing environment via the computerized telecommunications network;
   selecting, from the pool of audio assets in the vault, the at least one generated audio asset or the synthesized audio asset and at least one other related asset from the pool of related assets to form a creative;
   requesting delivery of the creative to a second electrical communication device; and
   delivering the creative to a second processor associated with the second electrical communication device via the computerized telecommunications network.

2. The method of claim 1, wherein the at least one generated audio asset is a voice snippet.

3. The method of claim 1, wherein the related audio assets comprise voice snippets.

4. The method of claim 1, wherein the at least one recording is recorded by the central processing environment.

5. The method of claim 1, wherein the synthesizing is performed by the central processing environment.

6. The method of claim 1, wherein selecting the at least one generated audio and the at least one related asset to form a creative is based on polling results.

7. The method of claim 1, wherein synthesizing the first audio asset is based on segments stringed together from previously recorded media.

8. The method of claim 1, wherein selecting the at least one generated audio and the at least one related asset to form a creative is based on at least one exclusion rule comprising one of a geographic, product, brand association, and pre-existing endorsement limitations.

9. The method of claim 8, wherein generating the creative using the synthesized media asset and the received media asset comprises selecting one of the synthesized media asset and the received media asset based on polling results.

10. The method of claim 8, wherein generating the synthesized media asset is based on segments stringed together from previously recorded media.

11. The method of claim 8, wherein generating the creative using the synthesized media asset and the received media asset comprises selecting one of the synthesized media asset and the received media asset based on at least one exclusion rule comprising one of a geographic, product, brand association, and pre-existing endorsement limitations.

12. A computer implemented creative composition engine, comprising:
    a central processing environment comprising at least one processor, a digital recorder and a digital asset storage vault;
    a received at least a portion of an audio transmission from a first electrical communication device connected to the central processing environment via a computerized telecommunications network, wherein said received portion of the audio transmission is created by recordation by the digital recorder for inclusion into a pool of related audio assets stored in the vault in accordance with at least one parameter provided by the first electrical communication device, wherein the at least one parameter is indicative of the creative and comprises payment schema, wherein the at least one recording is created within the central processing environment; and
    a synthesizer for synthesizing a selectable voice snippet asset pool for storage in the vault, wherein the central processing environment generates a creative comprising the at least one recording and at least one other related asset from the pool for delivery to a second electrical communication device, wherein the synthesizer is configured to identify constitution of sound units using one of syllables, demi-syllables, and pairs of half syllables, wherein the synthesizer uses at least one exclusion rule to reject accented syllables.

13. The engine of claim 12, wherein the central processing environment further comprises the synthesizer for synthesizing a selectable voice snippet.

14. The engine of claim 12, wherein the selectable synthesized voice snippet asset pool is generated from the audio transmission.

15. The engine of claim 12, wherein the central processing environment generates a creative comprising the at least one recording and at least one other related asset based on polling results.

16. The engine of claim 12, wherein synthesizing the selectable voice snippet asset is based on segments stringed together from previously recorded media.

17. A computer implemented method for creating an on-demand creative comprising:
    receiving, at a central processing environment, a first media asset from a first device;
    generating, at the central processing environment, a synthesized media asset using a second media asset associated with the received media asset, wherein the second media asset is stored in a pool of assets that is communicatively coupled to the central processing environment wherein generating the synthesized media comprises identifying constitution of sound units using one of syllables, demi-syllables, and pairs of half syllables, and using least one exclusion rule to reject accented syllables;

storing the synthesized and the received media assets in the pool of assets;
generating a creative using the synthesized media asset and the received media asset; and
delivering the creative to a second device.

* * * * *